US011714922B2

United States Patent
Kawanishi et al.

(10) Patent No.: US 11,714,922 B2
(45) Date of Patent: Aug. 1, 2023

(54) INSPECTION DEVICE, INSPECTION RESULTS MANAGEMENT SYSTEM, INSPECTION RESULTS STORAGE METHOD, AND INSPECTION RESULTS MANAGEMENT METHOD

(71) Applicant: ISHIDA CO., LTD., Kyoto (JP)

(72) Inventors: Norio Kawanishi, Ritto (JP); Yoichiro Abe, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 0 days.

(21) Appl. No.: 17/045,180

(22) PCT Filed: Feb. 4, 2020

(86) PCT No.: PCT/JP2020/004206
§ 371 (c)(1),
(2) Date: Oct. 5, 2020

(87) PCT Pub. No.: WO2020/175042
PCT Pub. Date: Mar. 9, 2020

(65) Prior Publication Data
US 2021/0090243 A1   Mar. 25, 2021

(51) Int. Cl.
*G06F 21/64* (2013.01)
*G06F 16/55* (2019.01)
(Continued)

(52) U.S. Cl.
CPC .............. *G06F 21/64* (2013.01); *G06F 16/51* (2019.01); *G06F 16/55* (2019.01); *G06T 7/0004* (2013.01);
(Continued)

(58) Field of Classification Search
CPC ........... G06Q 30/0185; G06Q 10/0833; G06Q 20/12; G06Q 20/3823; G06Q 20/401;
(Continued)

(56) References Cited

U.S. PATENT DOCUMENTS

| | | | |
|---|---|---|---|
| 10,163,080 B2 * | 12/2018 | Chow | G06Q 50/18 |
| 2019/0213462 A1 * | 7/2019 | McDonald | G06Q 10/0833 |
| 2019/0370816 A1 * | 12/2019 | Hu | G06Q 20/3823 |

FOREIGN PATENT DOCUMENTS

| | | |
|---|---|---|
| CN | 106534662 A | 3/2017 |
| CN | 108694594 A | 10/2018 |

(Continued)

OTHER PUBLICATIONS

Preliminary Report on Patentability (with Written Opinion) from the corresponding International Patent Application No. PCT/JP2020/004206 dated Sep. 2, 2021.
(Continued)

*Primary Examiner* — Manuchehr Rahmjoo
(74) *Attorney, Agent, or Firm* — Shinjyu Global IP (57) ABSTRACT

An inspection apparatus includes an image-capturing unit configured to capture an image of an article, an inspection unit configured to inspect the article, a generation-processing unit, and a storage-processing unit. The generation-processing unit generates a data group related to an inspection result obtained by the inspection unit, the data group including article information for distinguishing the article, the inspection result obtained by the inspection unit, captured-image information for distinguishing a captured image captured by the image-capturing unit from another captured image, and a hash value of the captured image that are associated with each other. The storage-processing unit stores the data group and the captured image in respective different storage units.

12 Claims, 6 Drawing Sheets

(51) Int. Cl.
*G06F 16/51* (2019.01)
*G06T 7/00* (2017.01)
*G06F 18/22* (2023.01)
*G06V 30/10* (2022.01)

(52) U.S. Cl.
CPC .... *G06F 18/22* (2023.01); *G06T 2207/30136* (2013.01); *G06V 30/10* (2022.01)

(58) Field of Classification Search
CPC .......... G06Q 20/4016; G06Q 2220/00; G06Q 30/018; G06K 9/20
See application file for complete search history.

(56) References Cited

FOREIGN PATENT DOCUMENTS

| | | |
|---|---|---|
| CN | 109034843 A | 12/2018 |
| CN | 109034851 A | 12/2018 |
| JP | 2004-150908 A | 5/2004 |
| JP | 2004-194129 A | 7/2004 |
| JP | 2005-310038 A | 11/2005 |
| JP | 2018-173692 A | 11/2018 |
| WO | 2018/225428 A1 | 12/2018 |
| WO | 2019/016602 A2 | 1/2019 |

OTHER PUBLICATIONS

The Search Report from the corresponding European Patent Application No. 20762684.7 dated Dec. 7, 2021.
The Search Report (with Written Opinion) from the corresponding International Patent Application No. PCT/JP2020/004206 dated Apr. 7, 2020.

* cited by examiner

DETAIL

| CODE | MR28 |
| --- | --- |
| FACTORY | SHIGA FACTORY |
| BAR CODE | 1234567890123 |
| USED BY DATE | 2018.09.01 A.M. 10:00 |
| LINE | M LINE |
| INSPECTION TIME | 18:28 |
| INSPECTION RESULT | OK |

⋮ ⋮

FRONT-SIDE LABEL

BACK-SIDE LABEL

INSPECTION DEVICE, INSPECTION RESULTS MANAGEMENT SYSTEM, INSPECTION RESULTS STORAGE METHOD, AND INSPECTION RESULTS MANAGEMENT METHOD

CROSS-REFERENCE TO RELATED APPLICATIONS

This application claims priority to Japanese Patent Application No. 2019-031997, filed on Feb. 25, 2019. The contents of that application are incorporated by reference herein in their entirety.

TECHNICAL FIELD

One aspect of the present invention relates to an inspection apparatus, an inspection-result management system, an inspection-result storage method, and an inspection-result management method.

BACKGROUND ART

Recently, there has been a need to record various types of information in a process of producing a product and, if some problem occurs in the product, management is performed so as to be able to identify the cause of the problem. At the same time, there has been a need to ensure the presence or absence of tampering in the various types of information recorded. As means for satisfying such requirements, for example, Japanese Unexamined Patent Publication No. 2004-194129 describes a method for trading image information, in which reliability is increased by adding inspection information, such as the time of image capturing, to a captured image acquired by image-capturing means, and also captured-image data is transferred to a data management company via the Internet or the like immediately after the image capturing, without being stored in the image-capturing means.

BRIEF SUMMARY

However, the conventional method described above makes it possible to limitlessly reduce the possibility that the captured image acquired during inspection has been tampered with, but there is no means for checking the presence or absence of tampering with the captured image after transferring the captured image to the data management company.

In view of this, it is an object of one aspect of the present invention to provide an inspection apparatus, an inspection-result management system, an inspection-result storage method, and an inspection-result management method that enable an inspection result to be stored so that the presence or absence of tampering with a captured image acquired during inspection can be checked.

An inspection apparatus according to one aspect of the present invention includes: an image-capturing unit configured to capture an image of an article; an inspection unit configured to inspect the article; a generation-processing unit configured to generate a data group related to an inspection result obtained by the inspection unit, the data group including article information for distinguishing the article, the inspection result obtained by the inspection unit, captured-image information for distinguishing a captured image captured by the image-capturing unit from another captured image, and a hash value of the captured image that are associated with each other; and a storage-processing unit configured to store the data group and the captured image in respective different storage units.

An inspection-result storage method according to one aspect of the present invention includes: an image-capturing step of capturing an image of an article; an inspection step of inspecting the article; a generation-processing step of generating a data group related to an inspection result obtained at the inspection step, the data group including article information for distinguishing the article, the inspection result obtained at the inspection step, captured-image information for distinguishing a captured image captured at the image-capturing step from another captured image, and a hash value of the captured image that are associated with each other; and a storage-processing step of storing the data group and the captured image in respective different storage units.

Herein, the hash value of the captured image means a hash value of data of the captured image obtained from a hash function. In the inspection apparatus and the inspection-result storage method, when there is a desire to view a captured image of a desired article, captured-image information associated with article information of the desired article is extracted from the data group stored in the corresponding storage unit. A captured image that matches the extracted captured-image information is identified from among a plurality of captured images stored in the other storage unit. This enables the captured image of the desired article to be viewed. When there is a desire to check the presence or absence of tampering with this captured image, the hash value of the identified captured image is calculated. The calculated hash value is then compared with a hash value included in the data group corresponding to the article information. If the hash values to be compared coincide with each other, it can be confirmed that the captured image has not been tampered with. If the hash values do not coincide with each other, it can be confirmed that there is a possibility of tampering with the captured image. In other words, in the inspection apparatus and the inspection-result storage method according to the aspects of the present invention, the inspection result can be stored so that the presence or absence of tampering with the captured image captured during inspection can be checked.

In the inspection apparatus according to one aspect of the present invention, the storage-processing unit may store the data group in a storage unit configured to store the data group as a blockchain. In the inspection-result storage method according to one aspect of the present invention, the data group may be stored as a blockchain at the storage-processing step. According to this configuration and the method, the above-described data group can be more safely managed. Furthermore, when the data group is stored as a blockchain, a step of forming a block (step of identifying a nonce value) generally requires time. Thus, there is a desire to transmit the data group to a blockchain network as soon as possible. However, the size of a captured image is generally large, and transmission of continuously acquired captured images to the blockchain network requires time. In the inspection apparatus of this aspect of the present invention, the data group to be transmitted to the blockchain network includes the hash value of the captured image but does not include the captured image itself. Thus, the size of the data group is significantly small. This can significantly reduce the period of time for completing transmission of the data group to the blockchain network.

In the inspection apparatus according to one aspect of the present invention, the captured-image information may be a file path of the captured image in a storage unit configured to store the captured image. With this configuration, information that can be easily distinguished can be imparted to the captured image.

In the inspection apparatus according to one aspect of the present invention, the inspection unit may inspect the article on the basis of the captured image. With this configuration, the presence or absence of tampering with the captured image acquired as the inspection result can be checked.

The inspection apparatus according to one aspect of the present invention may further include an article identification unit configured to identify a type of the article on the basis of the captured image. With this configuration, the presence or absence of tampering with the captured image used for identifying an article can be checked.

An inspection-result management system according to one aspect of the present invention may include: the inspection apparatus described above; a first storage unit configured to store the data group; and a second storage unit being a storage unit configured to store the captured image and configured as a medium different from the first storage unit. The storage-processing unit of the inspection apparatus may store the data group in the first storage unit and store the captured image in the second storage unit.

An inspection-result management system according to one aspect of the present invention includes an inspection apparatus including: an image-capturing unit configured to capture an image of an article; an inspection unit configured to inspect the article; a generation-processing unit configured to generate a data group related to an inspection result obtained by the inspection unit, the data group including article information for distinguishing the article, the inspection result obtained by the inspection unit, captured-image information for distinguishing a captured image captured by the image-capturing unit from another captured image, and a hash value of the captured image that are associated with each other; and a storage-processing unit configured to store the data group and the captured image in respective different storage units. The inspection-result management system also includes a first storage unit configured to store the data group and a second storage unit configured as a medium different from the first storage unit. The storage-processing unit of the inspection apparatus stores the data group in the first storage unit and stores the captured image in the second storage unit.

An inspection-result management method according to one aspect of the present invention includes: an image-capturing step of capturing an image of an article; an inspection step of inspecting the article; a generation-processing step of generating a data group related to an inspection result obtained at the inspection step, the data group including article information for distinguishing the article, the inspection result obtained at the inspection step, captured-image information for distinguishing a captured image captured at the image-capturing step from another captured image, and a hash value of the captured image that are associated with each other; and a storage-processing step of storing the data group and the captured image in respective different storage units. The data group is stored in a first storage unit and the captured image is stored in a second storage unit configured as a medium different from the first storage unit at the storage-processing step.

In the inspection-result management system and the inspection-result management method, a person who uses the inspection-result management system can easily view the inspection result including the captured image. Specifically, the inspection-result management system and the inspection-result management method perform operation described below automatically, and provide information on the inspection result and the presence or absence of tampering with the captured image. More specifically, when there is a desire to view a captured image of a desired article, captured-image information associated with article information of the desired article is extracted from the data group stored in the first storage unit. A captured image that matches the extracted captured-image information is identified from among a plurality of captured images stored in the second storage unit. This enables the captured image of the desired article to be viewed. When the presence or absence of tampering with this captured image is checked, the hash value of the captured image identified in the second storage unit is calculated. The calculated hash value is then compared with a hash value included in the data group corresponding to the article information. If the hash values to be compared coincide with each other, it can be confirmed that the captured image has not been tampered with. If the hash values do not coincide with each other, it can be confirmed that there is a possibility of tampering with the captured image.

In the inspection-result management system according to one aspect of the present invention, the first storage unit may store the data group as a blockchain. In the inspection-result management method according to one aspect of the present invention, the data group may be stored as a blockchain at the storage-processing step. With this configuration, the data group can be more safely managed. Furthermore, the period of time for completing transmission of the data group to the blockchain network can be significantly reduced, and thus inspection results that are generated continuously can be integrated into a block.

The inspection-result management system according to one aspect of the present invention may further include a search unit including: a receiving unit configured to receive the article information; an extraction unit configured to extract the captured-image information and the hash value, which are associated with the article information received by the receiving unit, from the data group stored in the first storage unit; an identification unit configured to extract the captured image, which is identified with the captured-image information extracted by the extraction unit as a key, from a plurality of the captured images stored in the second storage unit; and a presentation unit configured to present the captured image extracted by the identification unit if the hash value calculated on the basis of the captured image extracted by the identification unit coincides with the hash value extracted by the extraction unit.

The inspection-result management method according to one aspect of the present invention may further include: a receiving step of receiving the article information; an extraction step of extracting the captured-image information and the hash value, which are associated with the article information received at the receiving step, from the data group stored in the first storage unit; an identification step of extracting the captured image, which is identified with the captured-image information extracted at the extraction step as a key, from a plurality of the captured images stored in the second storage unit; and a presentation step of presenting the captured image extracted at the identification step if the hash value calculated on the basis of the captured image extracted at the identification step coincides with the hash value extracted at the extraction step.

According to the inspection-result management system and the inspection-result management method thus configured, the captured image acquired during inspection can be provided easily and reliably.

In the inspection-result management system according to one aspect of the present invention, if the hash value calculated on the basis of the captured image extracted by the identification unit does not coincide with the hash value extracted by the extraction unit, the presentation unit may provide notification that the captured image extracted by the identification unit has been tampered with. With the inspection-result management system thus configured, a user of the inspection-result management system can be clearly notified of the presence or absence of tampering with the captured image.

According to one aspect of the present invention, the inspection result can be stored so that the presence or absence of tampering with the captured image acquired during inspection can be checked.

DETAILED DESCRIPTION

A preferred embodiment according to one aspect of the present invention will now be described in detail with reference to the attached drawings. In the description of the drawings, like or equivalent elements are designated by like reference signs, and duplicate description thereof is omitted.

An inspection-result management system 100 according to the embodiment is a system configured to manage inspection results of products W produced in a factory in which a plurality of processing devices are disposed. An inspection-result management method according to the embodiment is a method for managing the inspection results of products W produced in the factory in which the processing devices are disposed. For example, the inspection-result management system 100 manages inspection results to be checked in an inspection line in which packaged rice balls (hereinafter, also called "products W") are inspected. The inspection-result management system 100 manages inspection results in a label inspection apparatus 10, for example.

Figure 1:
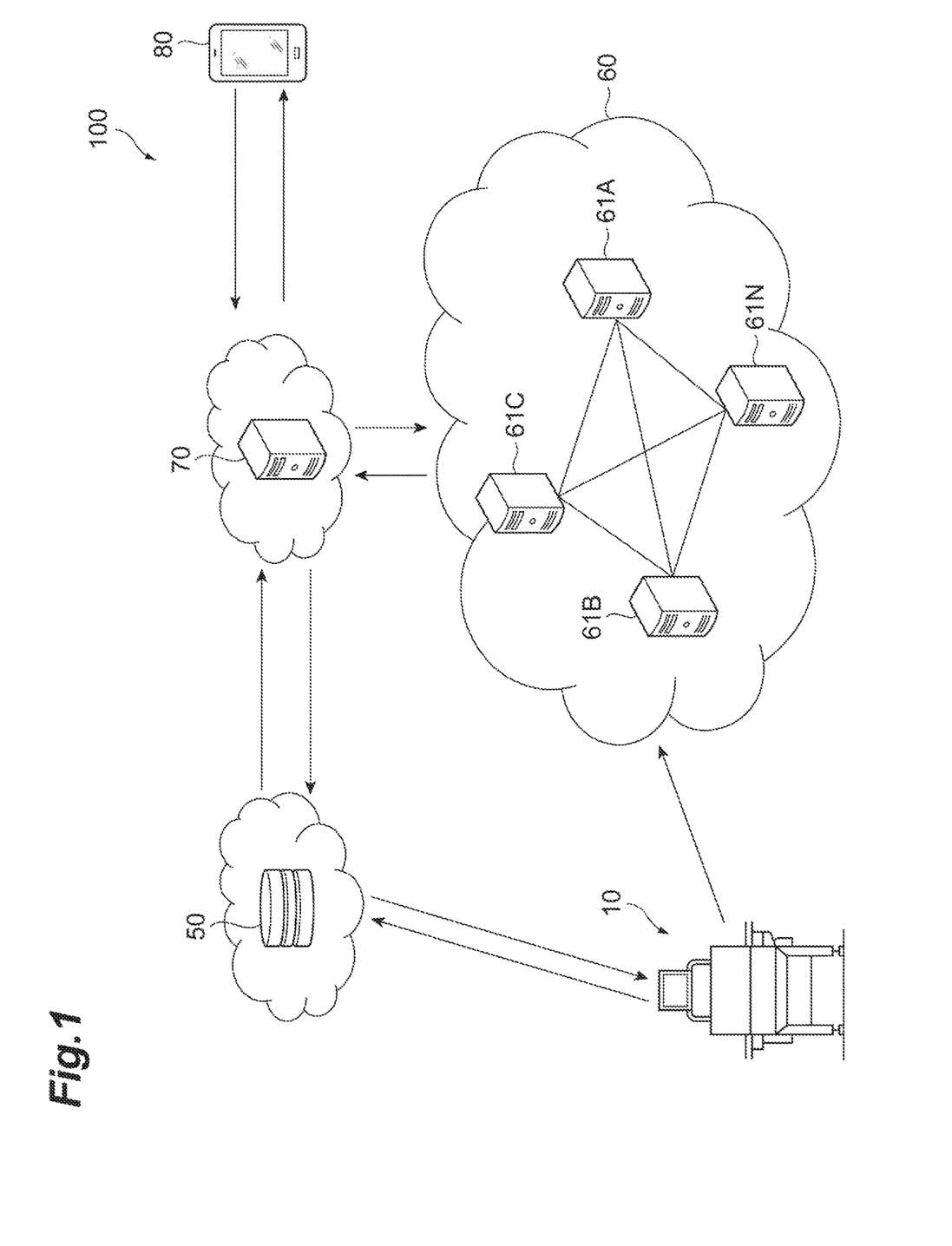
FIG. 1 is a schematic diagram of an inspection-result management system according to one embodiment.

As illustrated in FIG. 1, the inspection-result management system 100 includes the label inspection apparatus (inspection apparatus) 10, a file server 50, a blockchain network 60, and a search server (search unit) 70. The label inspection apparatus 10 is provided in a manner capable of communicating with each of the file server 50 and the blockchain network 60 via a network. The file server 50 is provided in a manner capable of communicating with each of the label inspection apparatus 10 and the search server 70 via the network. The blockchain network 60 is provided in a manner capable of communicating with each of the label inspection apparatus 10 and the search server 70 via the network. The search server 70 is provided in a manner capable of communicating with the file server 50, a terminal device 80 such as a smart phone and a personal computer that a user who uses the inspection-result management system 100 has, and the blockchain network 60 via the network.

The label inspection apparatus 10 is a device configured to check a label stuck on a product W. The label inspection apparatus 10 forms part of an inspection line 1 (see FIG. 2) in which various types of inspections of the product W are performed. The file server 50 stores a captured image of the product W acquired by the label inspection apparatus 10. Examples of data of the captured image include known formats such as PEG GIF, PNG, TIFF, BMP, SVG, EPS, and RAW.

The blockchain network 60 manages an inspection result (transaction data) of a product W obtained by the label inspection apparatus 10. The blockchain network 60 is a network including a plurality of management server devices 61A, 61B, 61C, . . . , and 61N to implement a known blockchain technique. The search server 70 provides the inspection result of the product W including a captured image of the label L to a user of the inspection-result management system 100. The label inspection apparatus 10, the file server 50, the blockchain network 60, and the search server 70 will be described hereinafter in detail.

Figure 2:
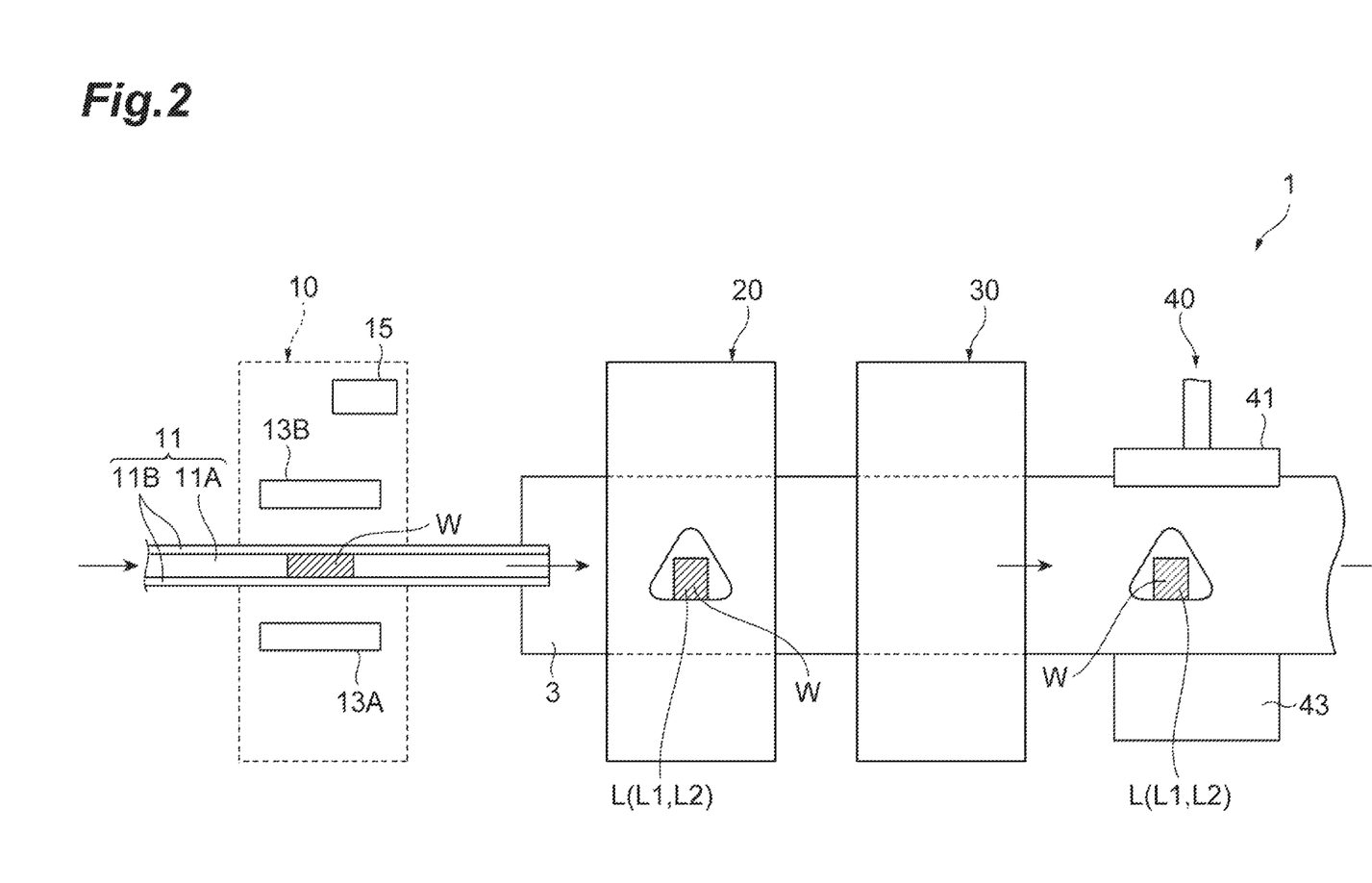
FIG. 2 is a plan view illustrating a schematic configuration of an inspection line in which the inspection-result management system is used.

The following describes the above-described inspection line 1 that is part of a production line of the product W. As illustrated in FIG. 2, the above-described inspection line 1 includes the label inspection apparatus 10, a conveyance device 3, a metal detection device 20, a weight-checking device 30, and a sorting device 40. The metal detection device 20, the weight-checking device 30, and the sorting device 40 are disposed on a conveyance path of the conveyance device 3. The inspection line 1 checks the label of the product W, the presence or absence of contamination with a foreign matter in the product W, and the weight of the product W. The inspection line 1 is a line in which, as a result of this inspection, a product that fails to meet criteria (a product W that has been determined to be defective) is removed, and a product that meets the criteria (a product W that has been determined to be a conforming product) is packed and shipped.

Figure 6:
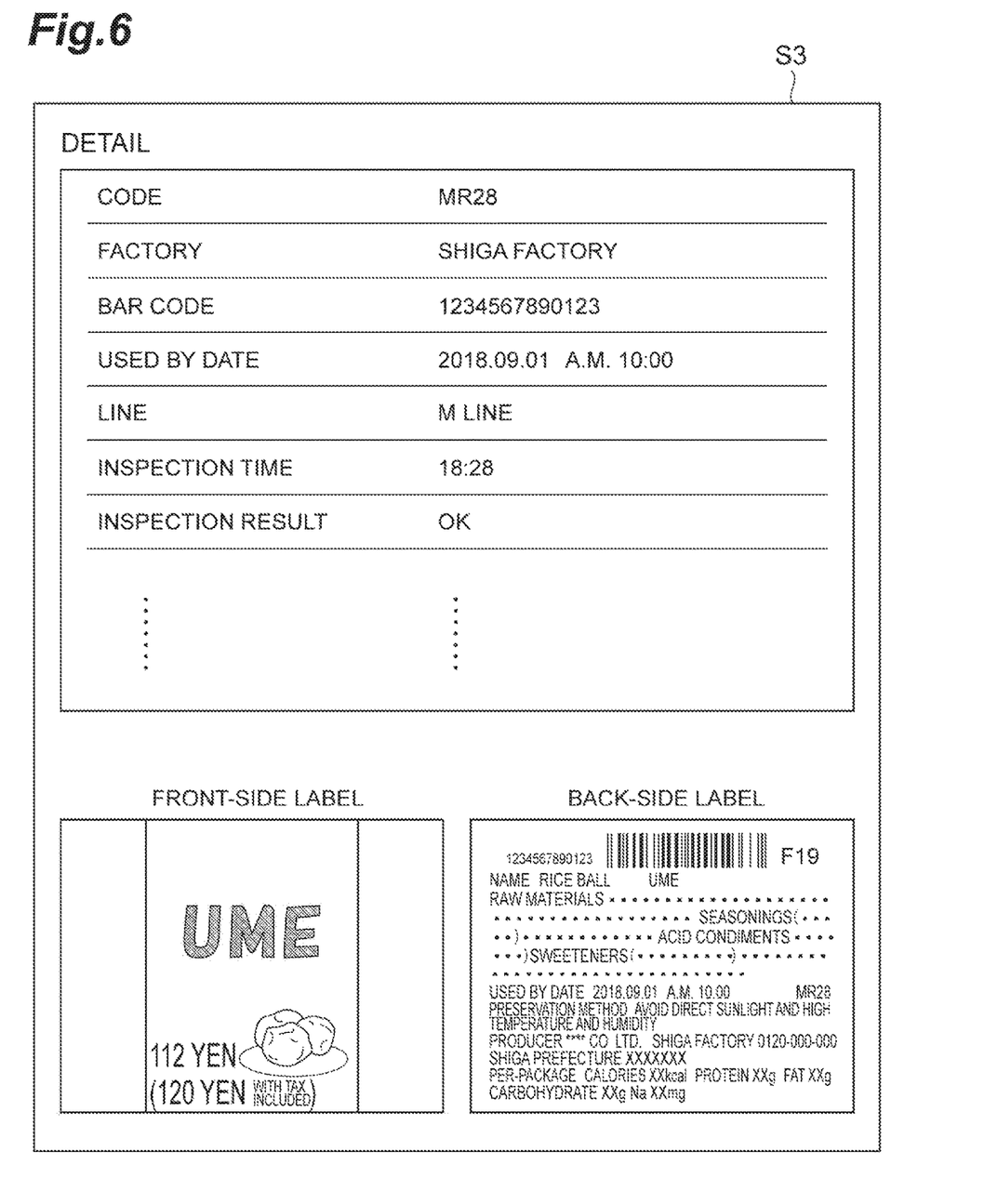
FIG. 6 is a diagram illustrating one example of a search result detailed screen that the search server presents.

A rice ball to be produced in the present embodiment has a pair of side surfaces the shapes of which are substantially a triangle when seen in planar view. Onto a surface of a product W corresponding to one of the pair of side surfaces, a front-side label L1 (L) is stuck. Onto the other surface, a back-side label L2 (L) is stuck. On the front-side label L1, a commodity name, a price, and a tax-inclusive price, for example, are printed as illustrated in FIG. 6. On the back-side label L2, a commodity bar code, a commodity name, raw material names, use by date, a producer, contact information of the producer, and a location of production, for example, are printed. Herein, these printed items are examples, and are not limited to these examples.

As illustrated in FIG. 2, in the inspection line 1, each product W passes through the label inspection apparatus 10, the metal detection device 20, the weight-checking device 30, the sorting device 40, and a packing device (not illustrated) disposed downstream of the sorting device 40 in this order. The label inspection apparatus 10 inspects the front-side label L1 and the back-side label L2 stuck on the product W. Details of the label inspection apparatus 10 will be described later. The metal detection device 20 checks the presence or absence of contamination with metal in the product W. The weight-checking device 30 checks the weight of the product W.

The sorting device 40, using a sorting unit such as an arm 41 or an air-jet device (not illustrated), sorts products W on which determination has been made by the label inspection apparatus 10, the metal detection device 20, and the weight-checking device 30 into conforming products and defective products. Specifically, the sorting device 40 causes the conveyance device 3 to convey, straight downstream in the conveyance direction, a product W that has been determined to be a conforming product by all of the label inspection apparatus 10, the metal detection device 20, and the weight-checking device 30, and sorts out a product W that has been determined to be a defective product by at least one of the label inspection apparatus 10, the metal detection device 20, and the weight-checking device 30 into a waste box 43. The packing device packs products W in a case such as a returnable box.

Figure 3:
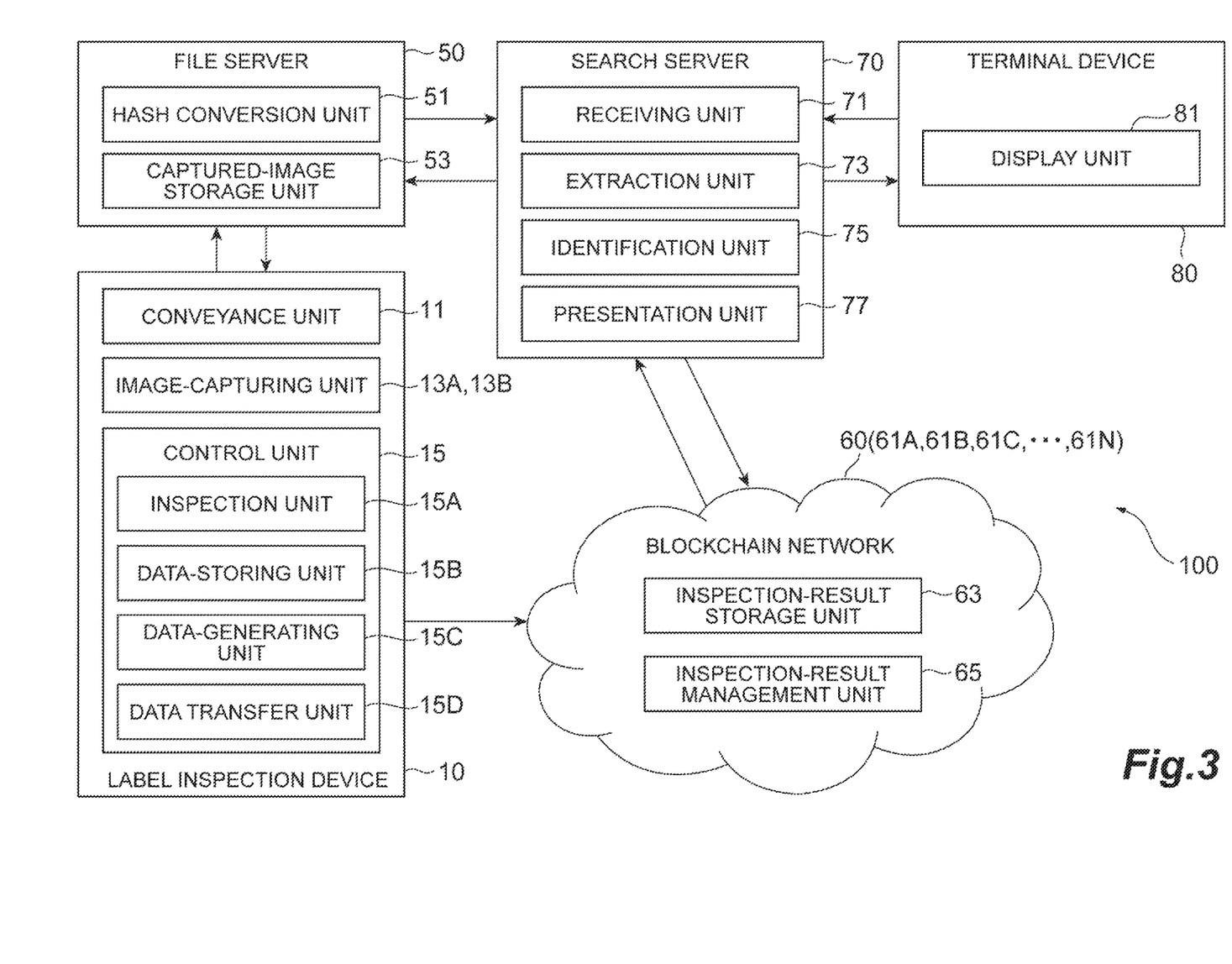
FIG. 3 is a function block diagram illustrating a functional configuration of the inspection-result management system according to the embodiment.

As illustrated in FIG. 2 and FIG. 3, the label inspection apparatus 10 includes a conveyance unit 11, a pair of image-capturing units 13A, 13B, and a control unit 15. The conveyance unit 11 includes a conveyor unit 11A configured to convey a product W while supporting a lower portion thereof and a pair of guide units 11B, 11B extending along the conveyance direction of the product W and disposed so as to be opposed to each other in a width direction orthogonal to the conveyance direction. The conveyor unit 11A is a belt conveyor, for example. The guide units 11B, 11B support portions of a product W corresponding to side surfaces of a rice ball such that the product W is conveyed with the front-side label L1 and the back-side label L2 thereof facing toward the horizontal direction.

The pair of image-capturing units 13A, 13B captures images of the front-side label L1 and the back-side label L2 of the product W. The image-capturing unit 13A captures the image of front-side label L1 of the product W, and the image-capturing unit 13B captures the image of the back-side label L2 of the product W (image-capturing step). The respective captured images captured by the image-capturing units 13A, 13B are transmitted to the file server 50 by the control unit 15.

The control unit 15 is an electronic control unit including a central processing unit (CPU), a read only memory (ROM), and a random access memory (RAM). The control unit 15 controls various operations in the label inspection apparatus 10. Specifically, the control unit 15 controls the conveyance unit 11 and the image-capturing units 13A, 13B. The control unit 15 may be configured as software to be executed by the CPU after a program stored in the ROM is loaded into the RAM. The control unit 15 may be configured as hardware including an electronic circuit. In the control unit 15, the CPU, the hardware such as the RAM and the ROM, and the software such as the program operate in a cooperative manner, whereby an inspection unit 15A, a data-storing unit (storage-processing unit) 15B, a data-generating unit (generation-processing unit) 15C, and a data transfer unit (storage-processing unit) 15D described later can be formed. The control unit 15 communicates with the file server 50 and the blockchain network 60 via the network.

The inspection unit 15A inspects a product W on the basis of captured images captured by the pair of image-capturing units 13A, 13B (inspection step). The inspection unit 15A checks, for example, whether the front-side label L1 and the back-side label L2 stuck on the product W are correct (whether they match the contents), whether the "best before" date is correctly printed, and whether the printed commodity name and the commodity bar code match each other.

Checking whether the front-side label L1 and the back-side label L2 stuck on the product W are correct can be determined on the basis of, for example, a concordance rate obtained by comparing a reference image stored in advance as a correct label and the captured image acquired by the image-capturing units 13A (13B). Whether the "best before" date is printed correctly can be determined on the basis of whether the "best before" date extracted as a text information after extracting a text by a known method from the captured image acquired by the image-capturing unit 13A (13B) coincides with a predetermined "best before" date. Whether the printed commodity name and the commodity bar code match each other can be determined on the basis of, for example, whether information read out by a scanner provided for the bar code coincides with setting information set in advance as correct information.

The data-storing unit 15B stores captured images captured by the image-capturing units 13A, 13B and identification information for distinguishing the captured images from other captured images in a manner associated with each other in a captured-image storage unit (second storage unit) 53 of the file server 50. Specifically, the data-storing unit 15B transmits a front-side image of one product W captured by the image-capturing unit 13A and a back-side image of the one product W captured by the image-capturing unit 13B to the file server 50, and stores these images in the captured-image storage unit 53 of the file server 50. The data-storing unit 15B acquires the file path of the front-side image (or the back-side image) in the captured-image storage unit 53 and the hash value of the front-side image (or the back-side image) from the file server 50. Herein, the hash value of the image means a hash value of data of the captured image obtained from a hash function.

The data-generating unit 15C generates transaction data (data group) related to an inspection result obtained by the inspection unit 15A (generation-processing step). The transaction data is associated with product information (article information) for distinguishing a product W, an inspection result obtained by the inspection unit 15A, hash values of a front-side image and a back-side image acquired from the file server 50 (hereinafter, also called "file hash" of the back-side label and "file hash" of the front-side label), and captured-image information for distinguishing the captured image from other captured images. Examples of the product information include a factory code, a bar code, use by date, a line name, and inspection time. The inspection result is, for example, information such as OK or NG Examples of the captured-image information include a file path (location where a captured image is stored) of a captured image stored in the captured-image storage unit 53 of the file server 50.

Figure 4:
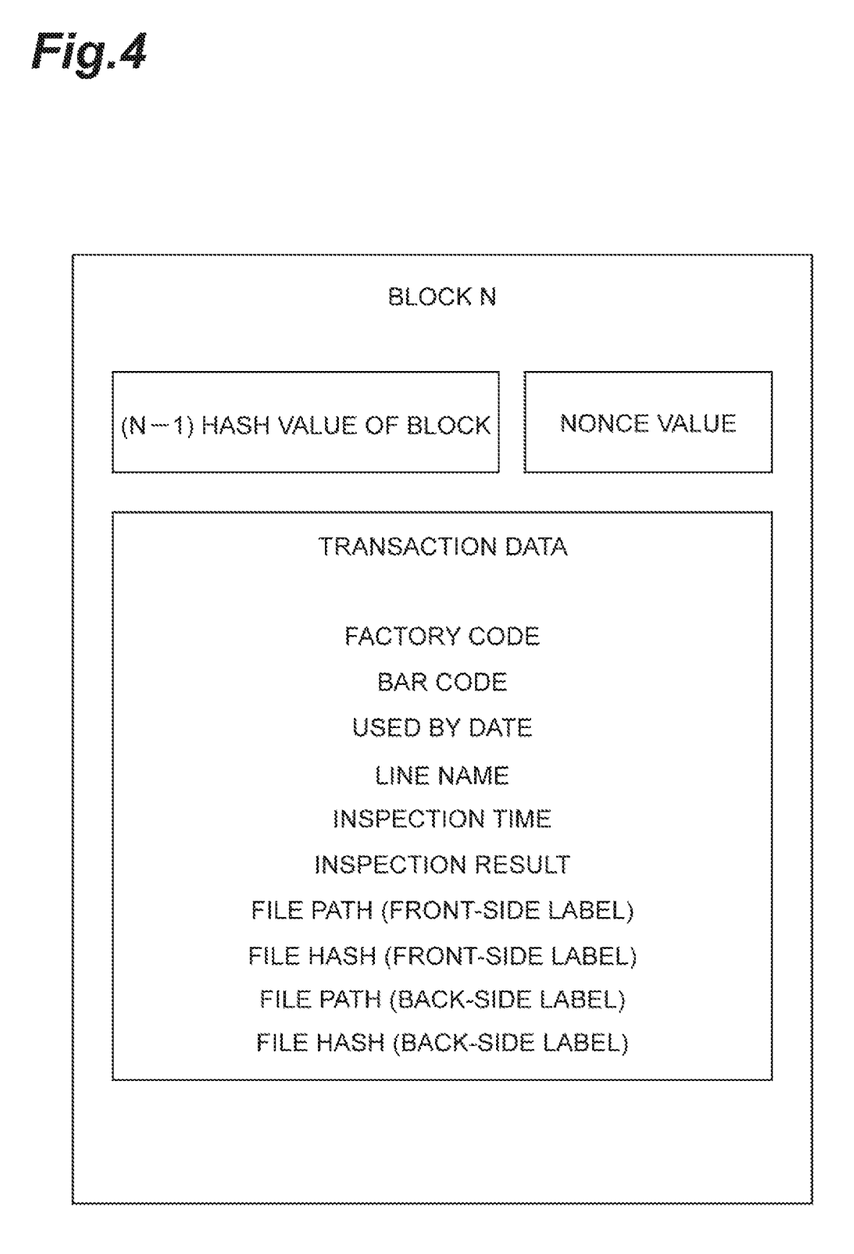
FIG. 4 is a configuration diagram illustrating a configuration of transaction data and a block when being stored as a blockchain.

More specifically, as illustrated in FIG. 4, the transaction data that the data-generating unit 15C generates includes a factory code, a bar code, use by date, a line name, inspection time, an inspection result, a file path for a front-side label, a file path for a back-side label, a file hash for the front-side label, and a file hash for the back-side label. Herein, the transaction data does not include a captured image itself. In the present embodiment, for each inspection for one product, one image of each of a front-side label and a back-side label is captured, and whether it is a conforming product or a defective product is determined on the basis of these captured images. Such data related to each inspection for each product is generated as one piece of transaction data.

FIG. 2 and FIG. 3 are referred to again. The data transfer unit 15D transmits transaction data generated by the data-generating unit 15C to the blockchain network 60. The data transfer unit 15D transmits transaction data to the blockchain network 60 every time the transaction data is generated.

As described above, the data-storing unit 15B and the data transfer unit 15D as storage-processing units store transaction data and a captured image in the respective different medium storage units (the file server and the blockchain network) (storage-processing step).

The file server 50 is configured as a computer system including a CPU, main storage units such as a RAM and a ROM, and an auxiliary storage unit examples of which include a hard disk and a flash memory. The auxiliary storage unit of the present embodiment is configured as the captured-image storage unit (second storage unit) 53 configured to store a captured image of a front-side label L1 and a captured image of a back-side label L2 to be transmitted from the label inspection apparatus 10. A function of a hash conversion unit 51 described later in detail is implemented under control of the CPU by reading predetermined computer software into hardware such as the CPU and the main storage units.

The hash conversion unit 51 converts data of captured images of labels L captured by the image-capturing units 13A, 13B into hash values. Specifically, when a captured image of a front-side label L1 and a captured image of a back-side label L2 have been transmitted from the label inspection apparatus 10, at this timing, the hash conversion unit 51 calculates the respective hash values and transmits the calculated hash values to the data-generating unit 15C of the label inspection apparatus 10.

The captured-image storage unit 53 stores the captured image of the front-side label L1 and the captured image of the back-side label L2 transmitted from the label inspection apparatus 10. At the timing of storing the captured images, the captured-image storage unit 53 transmits locations where the captured images of the front-side label L1 and the back-side label L2, that is, file paths to the data-generating unit 15C of the label inspection apparatus 10.

The blockchain network 60 includes the management server devices 61A, 61B, 61C, . . . , and 61N to form a peer to peer (P2P) network, for example. The management server devices 61A, 61B, 61C, . . . , and 61N form a distributed database, and store transaction data transmitted from the label inspection apparatus 10 as described above. For communication between the blockchain network 60 and the label inspection apparatus 10 and also between the blockchain network 60 and the search server 70, security is ensured by a cryptographic technology using a secret key and a public key. The following describes the management server devices 61A, 61B, 61C, . . . , and 61N.

Each of the management server devices 61A, 61B, 61C, . . . , 61N is configured as a computer system including a CPU, main storage units such as a RAM and a ROM and an auxiliary storage unit examples of which include a hard disk and a flash memory. The auxiliary storage unit of the present embodiment is configured as the inspection-result storage unit (first storage unit) 63 configured to store, as a blockchain, transaction data to be transmitted from the label inspection apparatus 10. The blockchain is information in which a plurality of blocks are connected. As illustrated in FIG. 4, each of the blocks includes a hash value of information indicating the next previous block, a nonce value, and transaction data. The nonce value is information used for setting the hash value of the block to a value satisfying a specific condition. A function of an inspection-result management unit 65 described later in detail is implemented under control of the CPU by reading predetermined computer software into hardware such as the CPU and the main storage units.

FIG. 2 to FIG. 4 are referred to. When one piece of transaction data is input (has been transmitted) into the blockchain network 60 from the label inspection apparatus 10, this piece of transaction data is shared among the management server devices 61A, 61B, 61C, . . . , and 61N. At the same time, the inspection-result management unit 65 of each of the management server devices 61A, 61B, 61C, . . . , and 61N attempts to generate a block including a hash value of a block that is stored and has been generated last in the inspection-result storage unit 63, transaction data, and a nonce value. Specifically, the inspection-result management unit 65 attempts to identify a nonce value that enables the hash value of the block to satisfy a specific condition (e.g., values up to a predetermined digit are all zero).

Herein, when the inspection-result management unit 65 of one management server device (e.g., the management server device 61A) of the management server devices 61A, 61B, 61C, . . . , and 61N has identified a nonce value that matches the above-described condition, this inspection-result management unit 65 transmits a block including the identified nonce value to the other management server devices 61B, 61C, . . . , and 61N. In this manner, the new block formed by the management server device 61A is shared among the management server devices 61A, 61B, 61C, . . . , and 61N. In the blockchain network 60, every time transaction data is input from the label inspection apparatus 10, a new block related to the next previous block is formed by the above-described method, and the new block is shared among the management server devices 61A, 61B, 61C, . . . , and 61N. In other words, the inspection-result storage units 63 of the management server devices 61A, 61B, 61C, . . . , and 61N store the transaction data as a blockchain.

The search server 70 is configured as a computer system including a CPU, main storage units such as a RAM and a ROM, and an auxiliary storage unit examples of which include a hard disk and a flash memory. The respective functions of a receiving unit 71, an extraction unit 73, an identification unit 75, and a presentation unit 77 described later in detail are implemented under control of the CPU by reading predetermined computer software into hardware such as the CPU and the main storage units.

Figure 5A:
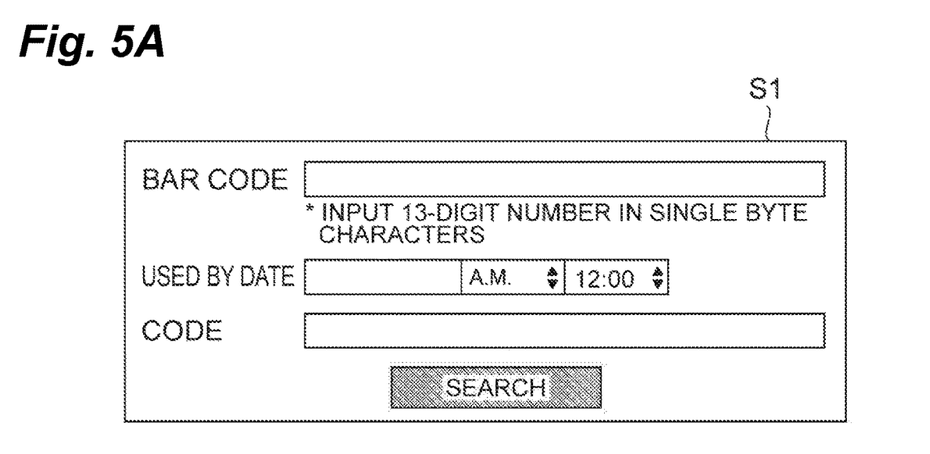
FIG. 5A is a diagram illustrating one example of a search screen that a search server provides.

The receiving unit 71 receives article information from the terminal device 80 (receiving step). Specifically, the receiving unit 71 causes the display unit of the terminal device 80 accessing the search server 70 to display a search screen 51 on which information on bar-code information, use by date, and a code as illustrated in FIG. 5A can be input. The code is a character string formed with a combination of a line name (one alphabetical letter), hour (one alphabetical letter associated with the hour), and time (minutes expressed in two-digit number). The receiving unit 71 also receives information that has been input on the search screen 51 and transmitted from the terminal device 80 when a search button has been operated.

The extraction unit 73 extracts captured-image information (file path) and a file hash (hash value) associated with the article information received by the receiving unit 71 from pieces of transaction data stored in the blockchain network 60 (extraction step).

The identification unit 75 extracts, from among a plurality of captured images stored in the captured-image storage unit 53 of the file server 50, a captured image that is identified with the captured-image information (file path) extracted by the extraction unit 73 as a key (identification step). Specifically, the identification unit 75 extracts, from the file server 50, a captured image stored in the file path extracted by the extraction unit 73.

Figure 5B:
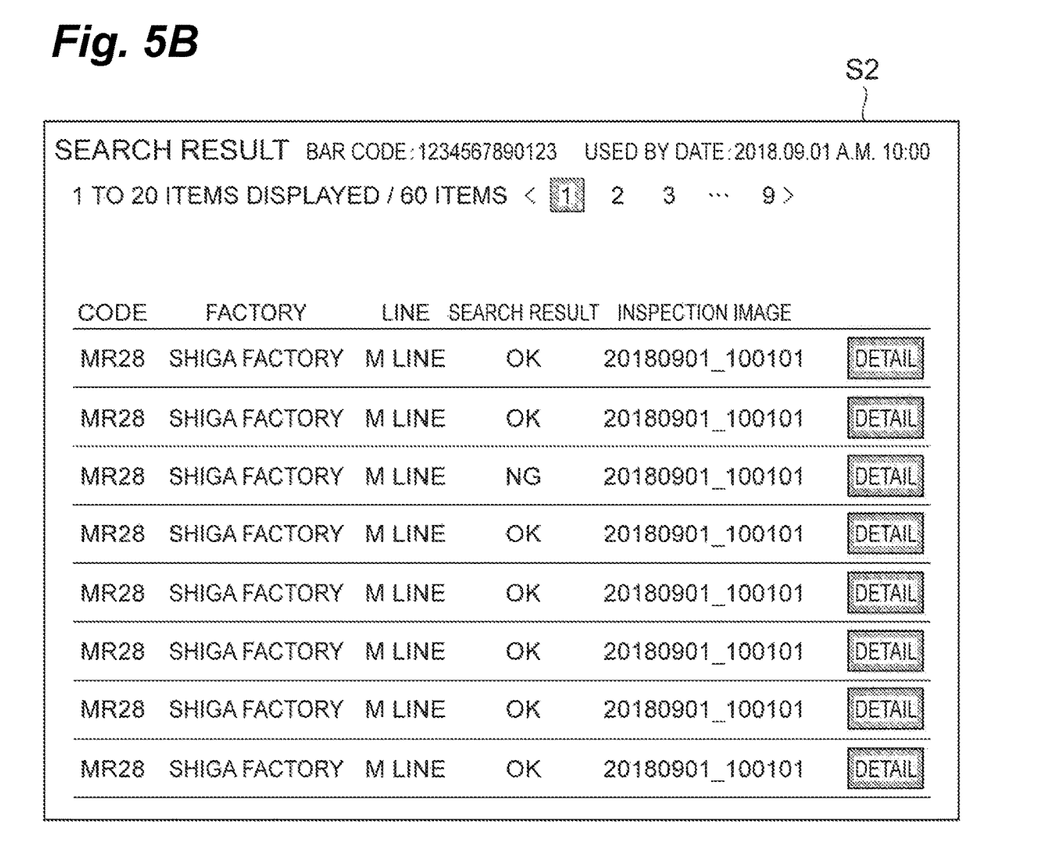
FIG. 5B is a diagram illustrating one example of a search result screen that the search server presents.

The presentation unit 77 calculates the hash value of the captured image extracted by the identification unit 75. The presentation unit 77 determines whether the hash value thus calculated coincides with the file hash (hash value) included in the transaction data extracted by the extraction unit 73. If these hash values coincide with each other, the presentation unit 77 presents the inspection result included in the transaction data and also the captured image to the terminal device 80 (presentation step). Specifically, as illustrated in FIG. 5B, the presentation unit 77 causes the display unit of the terminal device 80 to display an inspection-result screen S2 in which inspection results match the search condition received by the receiving unit 71.

The inspection-result screen S2 includes codes, factories, lines, inspection results, link texts of captured images, and link texts to detailed screens. In the inspection-result screen S2, when a link text of a captured image has been clicked, the captured image is displayed. In the inspection-result screen S2, when a link text to a detailed screen has been clicked, an inspection detailed screen S3 as illustrated in FIG. 6 is displayed. The user of the inspection-result management system can view, with the terminal device 80, the inspection result of label inspection of a desired product W.

If the above-described hash values do not coincide with each other, the presentation unit 77 does not have to present the captured image identified by the identification unit 75, or may provide notification that the captured image identified by the identification unit 75 is not an intended image.e.g., there is a possibility that the captured image has been tampered with.

FIG. 2 and FIG. 3 are referred to. The terminal device 80 is a terminal device configured to request the search server 70 to present an inspection result of a product W. Examples of the terminal device 80 includes a desktop terminal, a mobile terminal such as a smart phone, and a tablet terminal. The terminal device 80 is configured as a computer system including a CPU, main storage units such as a RAM and a ROM, an auxiliary storage unit examples of which include a hard disk and a flash memory, input units such as a touch panel, a keyboard, and a mouse, and an output unit such as a display unit 81.

On the display unit 81, the search screen S1 as illustrated in FIG. 5A is displayed by the receiving unit 71 of the search server 70, and the inspection-result screen S2 as illustrated in FIG. 5B and the inspection detailed screen S3 as illustrated in FIG. 6 are displayed by the presentation unit 77.

With the inspection-result management system 100 (the label inspection apparatus 10, the inspection-result storage method, and the inspection-result management method) according to the above-described embodiment, captured-image information associated with article information of a desired article is extracted from pieces of transaction data stored in the blockchain network 60, and a captured image that matches this extracted captured-image information is identified from among a plurality of captured images stored in the file server 50. This enables the captured image of the desired article to be viewed. In the present embodiment, by the function of the search server 70, a desired captured image can be easily viewed. In other words, with the label inspection apparatus 10 according to the above-described embodiment, inspection results can be stored so that the presence or absence of tampering with each captured image acquired during inspection can be checked.

Furthermore, with the inspection-result management system 100 (the label inspection apparatus 10, the inspection-result storage method, and the inspection-result management method) according to the above-described embodiment, the hash value of a captured image that has been identified as described above in the file server 50 is calculated, if the hash value thus calculated and a hash value included in transaction data corresponding to the article information coincide with each other, it can be confirmed that the captured image has not been tampered with. If the hash values do not coincide with each other, it can be confirmed that there is a possibility of tampering with the captured image. In the present embodiment, by the function of the search server 70, together with the inspection result, the presence or absence of tampering with the captured image can be presented.

With the inspection-result management system 100 (the label inspection apparatus 10, the inspection-result storage method, and the inspection-result management method) according to the above-described embodiment, transaction data is stored as a blockchain, and thus the transaction data can be more safely managed. In the inspection-result management system 100 according to the above-described embodiment, transaction data to be transmitted to the blockchain network includes the hash value of a captured image, but does not include the captured image itself. Thus, in comparison with the case in which a captured image is included as the transaction data, the size of the transaction data is significantly small. This can significantly reduce a period of time for the label inspection apparatus 10 to complete transmission of the transaction data to the blockchain network.

In the inspection-result management system 100 (the label inspection apparatus 10, the inspection-result storage method, and the inspection-result management method) in which transaction data is stored as a blockchain in particular, there is a demand that the transaction data is wanted to be transmitted to a blockchain network as soon as possible because a step of forming a block (step of identifying a nonce value) requires time. As described above, in the present embodiment, the size of the transaction data is significantly smaller than the case of transmitting the captured image as is, and thus the period of time for completing transmission of the transaction data to the blockchain network can be significantly reduced. Consequently, delay when inspection results that are continuously generated are integrated into a block can be reduced.

With the inspection-result management system 100 (the label inspection apparatus 10, the inspection-result storage method, and the inspection-result management method) according to the above-described embodiment, the captured-image information is a file path of a captured image in the file server 50 configured to store the captured image, and thus information that can be easily distinguished can be imparted to the captured image.

In the foregoing, one embodiment has been described. However, one aspect of the present invention is not limited to the above-described embodiment, and various modifications may be made without departing from the gist of the invention.

In the inspection-result management system 100 (the label inspection apparatus 10, the inspection-result storage method, and the inspection-result management method) according to the above-described embodiment, an example has been described in which inspection results obtained by inspection performed by the label inspection apparatus 10 are managed. However, the present invention is not limited to this. For example, instead of or in addition to the inspection results obtained by inspection performed by the label inspection apparatus 10, inspection results obtained by inspection performed by the metal detection device 20 and/or inspection results obtained by inspection performed by the weight-checking device 30 may be managed. In this case also, captured images acquired by the metal detection device 20 (inspection images acquired by the weight-checking device 30) may be transmitted to the file server 50, and transaction data may include file paths of these inspection images without including data of these inspection images. When the label inspection apparatus 10 and the metal detection device 20 disposed upstream or downstream thereof are provided in the inspection line, each image acquired by the label inspection apparatus 10 may be transmitted to the file server 50, and transaction data including the hash value of the image acquired by the label inspection apparatus 10, the corresponding inspection result obtained by inspection performed by the label inspection apparatus 10, and the corresponding inspection result obtained by inspection performed by the metal detection device 20 may be transmitted to the blockchain network 60.

Furthermore, other than the inspection apparatuses constituting the above-described inspection line, the present invention can be applied to, for example, an inspection apparatus configured to acquire a captured image in a state of being irradiated with light such as an X-ray, an infrared ray, or an ultraviolet ray and perform predetermined inspection on the basis of the captured image.

For the inspection-result management system 100 (the label inspection apparatus 10, the inspection-result storage method, and the inspection-result management method) according to the embodiment and the modifications above, an example of an inspection apparatus configured to inspect a product W on the basis of a captured image acquired by an image-capturing units have been described. However, the present invention can be applied to an inspection apparatus configured to inspect a product W without using this captured image. Examples of this inspection apparatus may include a metal detection device, a pinhole inspection apparatus, a weight-checking device, a seal inspection apparatus configured to check the presence or absence of leakage in a seal portion, and a package-thickness inspection apparatus. In these inspection apparatuses, a captured image is not used directly for inspection, but is used for identifying a commodity, for example. When a commodity is identified on the basis of a captured image, for example, an article identification unit configured to acquire a bar code, a digital watermark, or the like is acquired from the captured image, and perform commodity identification on the basis of the bar code, the digital watermark, or the like thus acquired may be provided to the inspection apparatuses. When such an inspection apparatus is applied to the present invention, a captured image used for commodity identification during inspection can be managed in a manner associated with the inspection result.

In the inspection-result management system 100 (the label inspection apparatus 10, the inspection-result storage method, and the inspection-result management method) according to the embodiment and the modifications above, an example has been described in which a captured image acquired by the label inspection apparatus 10 is transmitted to the file server 50 such as a cloud server to be stored therein. However, the present invention is not limited to this. For example, the captured image may be stored in a storage device provided to the label inspection apparatus 10 or a storage unit such as a hard disk configured to be able to access the label inspection apparatus 10 via a LAN, for example.

In the inspection-result management system 100 (the label inspection apparatus 10, the inspection-result storage method, and the inspection-result management method) according to the embodiment and the modifications above, an example has been described in which transaction data is stored as a blockchain. However, the transaction data may be stored as one piece of data of a relational database. In other words, the blockchain network does not have to be used. It should be noted that the effect of applying the present invention to the former is greater from the viewpoint that the former is more excellent for safety and inspection results are wanted to be transmitted one after another because integrating them into a block requires time.

In the inspection-result management system 100 (the label inspection apparatus 10, the inspection-result storage method, and the inspection-result management method) according to the embodiment and the modifications above, an example has been described in which the search server 70 is provided thereto. However, the search server 70 does not have to be provided. Even in this case, although some work is needed, the inspection result and the captured image of a desired commodity can be checked and also the presence or absence of tampering with the captured image can be checked.

In the inspection-result management system 100 (the label inspection apparatus 10, the inspection-result storage method, and the inspection-result management method) according to the embodiment and the modifications above, an example has been described in which a process of converting captured images acquired by the image-capturing units 13A, 13B into hash values is performed by the file server 50. However, the present invention is not limited to this. For example, an inspection apparatus such as the label inspection apparatus 10 may include a processing unit corresponding to the hash conversion unit 51. The inspection apparatus may also include a processing unit corresponding to the above-described captured-image storage unit 53. The inspection apparatus may also include a processing unit corresponding to the above-described search server 70. Furthermore, if transaction data is stored as a relational database in a storage unit that the inspection apparatus includes, functions corresponding to those of the inspection-result management system 100 described above can be implemented by the inspection apparatus alone.

In the inspection-result management system 100 (the label inspection apparatus 10, the inspection-result storage method, and the inspection-result management method) according to the embodiment and the modifications above, an example has been described in which transaction data is generated for each inspection for one article (e.g., when 50 products W are inspected for 1 minute, 50 pieces of transaction data are generated accordingly) and the transaction data is transmitted to the blockchain network 60 every time it is generated (e.g., 50 pieces of transaction data are transmitted for 1 minute). However, the present invention is not limited to this.

For example, the data-generating unit 15C may generate one piece of transaction data into which inspection results obtained during a predetermined period of time (e.g., 1 minute) are compiled, and the data transfer unit 15D may transmit this piece of transaction data to the blockchain network 60 simultaneously when it has been generated. The data-generating unit 15C and the data transfer unit 15D may appropriately adjust the quantity of inspection results when transaction data is generated and the transfer timing of the transaction data in accordance with the processing speed when the transaction data is integrated into a block.

In the inspection-result management system 100 (the label inspection apparatus 10, the inspection-result storage method, and the inspection-result management method) according to the embodiment and the modifications above, an example has been described in which data contents included in the transaction data are items as illustrated in FIG. 4. However, the present invention is not limited to this.

In the inspection-result management system 100 (the label inspection apparatus 10, the inspection-result storage method, and the inspection-result management method) according to the embodiment and the modifications above, an example has been described in which one piece of transaction data is included in one block as illustrated in FIG. 4. However, two or more pieces of transaction data may be included therein.

In the inspection-result management system 100 (the inspection-result management method) according to the embodiment and the modifications above, an example has been described in which one label inspection apparatus 10 and one inspection line 1 are included therein as illustrated in FIG. 1. However, it may be configured as a system configured to manage inspection results of a plurality of the label inspection apparatuses 10 and a plurality of the inspection lines 1. In this case, the system may include not only the label inspection apparatuses 10 but also other above-described inspection apparatuses.

In the embodiment and the modifications above, the present invention has been described as the inspection-result management system 100, the label inspection apparatus 10, the inspection-result storage method, and the inspection-result management method. However, the present invention may be implemented as an inspection-result management program and a computer-readable recording medium in which the inspection-result management program is stored.

More specifically, it may be configured as an inspection-result management program or a computer-readable recording medium in which the inspection-result management program is stored, which is for causing a computer (control unit 15) configured to store an inspection result obtained by an inspection apparatus configured to inspect an article to function as: generation-processing means for generating a data group related to an inspection result obtained by the inspection apparatus, the data group including article information for distinguishing the article, the inspection result obtained by the inspection apparatus, captured-image information for distinguishing a captured image captured by the image-capturing units from another captured image, and a hash value of the captured image that are associated with each other; and storage-processing means for storing the data group and the captured image in respective different storage units. In this case, the inspection-result management program causes the storage-processing means to function so as to store the data group in a first storage unit and store the captured image in a second storage unit configured as a medium different from the first storage unit. Furthermore, in this case, the inspection-result management program may cause the storage-processing means to function so as to store the above-described data group as a blockchain.

Furthermore, the inspection-result management program and the computer-readable recording medium in which the inspection-result management program is stored may cause a computer (search server 70) configured to present an inspection result to a user to function as: receiving means for receiving article information; extraction means for extracting, from the data group stored in the first storage unit, the captured-image information and the hash value that are associated with the article information received by the receiving means; identification means for extracting, from a plurality of the captured images stored in the second storage unit, the captured image that is identified with the captured-image information extracted by the extraction means as a key; and presentation means for presenting the captured image extracted by the identification means if the hash value calculated on the basis of the captured image extracted by the identification means coincides with the hash value extracted by the extraction means.

REFERENCE SIGNS LIST

1 . . . inspection line, 10 . . . label inspection apparatus (inspection apparatus), 13A, 13B . . . image-capturing unit, 15 . . . control unit, 15A . . . inspection unit, 15B . . . data-storing unit (storage-processing unit), 15C . . . data-generating unit (generation-processing unit), 15D . . . data transfer unit (storage-processing unit), 50 . . . file server, 51 . . . hash conversion unit, 53 . . . captured-image storage unit (second storage unit), 60 . . . blockchain network, 61A . . . management server device, 63 . . . inspection-result storage unit (first storage unit), 65 . . . inspection-result management unit, 70 . . . search server (search unit), 71 . . . receiving unit, 73 . . . extraction unit, 75 . . . identification unit, 77 . . . presentation unit, 80 . . . terminal device, 81 . . . display unit, 100 . . . inspection-result management system, W . . . product

The invention claimed is:

1. An inspection-result management system which manages the results of quality-control inspection of a plurality of articles, comprising:
a first, image storage unit and a second, blockchain storage unit;
an inspection apparatus including
an image-capturing unit configured to capture an image associated with each of said plurality of articles,
an inspection unit configured to inspect each of said plurality of articles, with an inspection result of inspecting each of said plurality of articles comprising a determination of whether each of said plurality of articles satisfies one or more predetermined quality-control criteria applicable to said plurality of articles and based on which a given one of said plurality of articles is assessed to be conforming or defective, and
a storage-processing unit configured to cause each of the images captured by the image-capturing unit to be stored in said first, image storage unit;
a hash-generating unit configured to generate a hash value associated with each of the images captured by the image-capturing unit and stored in said first, image storage unit,
a generation-processing unit configured to generate blockchain data groups, each of which is based in part on the inspection result or the inspection results obtained by inspecting one or more of said plurality of articles, each blockchain data group including, as an integrated data set, distinguishing article information; the inspection result or the inspection results obtained by inspecting said one or more of said plurality of articles by the inspection unit; captured-image information for distinguishing the image associated with each of said one or more articles stored in said first, image storage unit from other images stored in said first, image storage unit; and the hash value associated with the image associated with each of said one or more of said plurality of articles, each of said blockchain data groups excluding the image, per se, associated with each of said one or more of said plurality of articles, and a data-transfer unit configured to send the blockchain data groups to the second, blockchain storage unit.

2. The inspection-result management system according to claim 1, wherein the captured-image information is a file path of the captured image associated with each of said one or more of said plurality of articles and stored in the first, image storage unit.

3. The inspection-result management system according to claim 1, wherein the inspection unit inspects the articles based on their associated captured images.

4. The inspection-result management system according to claim 1, further comprising an article identification unit configured to identify a type of the articles based on their associated captured images.

5. The inspection-result management system according to claim 1, further comprising a search unit including a receiving unit configured to receive requested distinguishing article information, an extraction unit configured to extract from the blockchain data groups stored in the second, blockchain storage unit the captured-image information and the hash values associated with article information corresponding to said requested distinguishing article information, an identification unit configured to extract from the first, image storage unit the captured images stored therein that are identified by the captured-image information extracted from the blockchain data groups by the extraction unit, and a presentation unit configured to present a captured image that has been extracted from the first, image storage unit by the identification unit if a hash value calculated based on the captured image that has been extracted from the first, image storage unit coincides with a corresponding hash value that has been extracted from one of the blockchain data groups by the extraction unit.

6. The inspection-result management system according to claim 5, wherein if the hash value calculated based on the captured image that has been extracted from the first, image storage unit does not coincide with the corresponding hash value that has been extracted from said one of the blockchain data groups, the presentation unit provides notification that the captured image extracted from the first, image storage unit has been tampered with.

7. The inspection-result management system according to claim 1, wherein the first, image storage unit and the second, blockchain storage unit comprise separate memory devices.

8. The inspection-result management system according to claim 7, wherein the first, image storage unit and the second, blockchain storage unit are located on separate server devices.

9. The inspection-result management system according to claim 7, wherein the second, blockchain storage unit is part of a blockchain network.

10. An inspection-result storage method using an inspection apparatus to perform quality-control inspection of each of a plurality of articles; a first, image storage unit; and a second, blockchain storage unit, the method comprising:

an image-capturing step of capturing an image associated with each of said plurality of articles;

an inspection step of inspecting each of said plurality or articles, with an inspection result of inspecting each of said plurality of articles comprising a determination of whether each of said plurality of articles satisfies one or more predetermined quality-control conditions based on which a given one of said plurality of articles is assessed to be conforming or defective;

a storage-processing step comprising causing each of the images captured in the image-capturing step to be stored in said first, image storage unit;

a hash-generating step of generating a hash value associated with each of the images captured by the image-capturing unit and stored in said first, image storage unit;

a generation-processing step of generating blockchain data groups, each of which is based in part on the inspection result or the inspection results obtained by inspecting one or more of said plurality of articles, each blockchain data group including, as an integrated data set, distinguishing article information; the inspection result or the inspection results obtained by inspecting said one or more of said plurality of articles at the inspection step; captured-image information for distinguishing the image associated with each of said one or more articles stored in said first, image storage unit from other images stored in said first, image storage unit; and the hash value associated with the image associated with each of said one or more of said plurality of articles, each of said blockchain data groups excluding the image, per se, associated with each of said one or more of said plurality of articles; and a data-transfer step of sending the blockchain data groups to the second, blockchain storage unit.

11. The inspection-result management method according to claim 10, further comprising:

a receiving step of receiving requested distinguishing article information;

an extraction step of extracting from the blockchain data groups stored in the second, blockchain storage unit the captured-image information and the hash values associated with article information corresponding to said requested distinguishing article information;

an identification step of extracting from the first, image storage unit the captured images stored therein that are identified by the captured-image information extracted from the blockchain data groups at the extraction step; and a presentation step of presenting a captured image that has been extracted from the first, image storage unit at the identification step if a hash value calculated based on the captured image that has been extracted from the first, image storage unit coincides with a hash value that has been extracted from one of the blockchain data groups at the extraction step.

12. The inspection-result management method according to claim 11, wherein if the hash value calculated based on the captured image that has been extracted from the first, image storage unit does not coincide with the corresponding hash value that has been extracted from said one of the blockchain data groups, notification is provided that the captured image extracted from the first, image storage unit has been tampered with.

* * * * *